Figure 2:
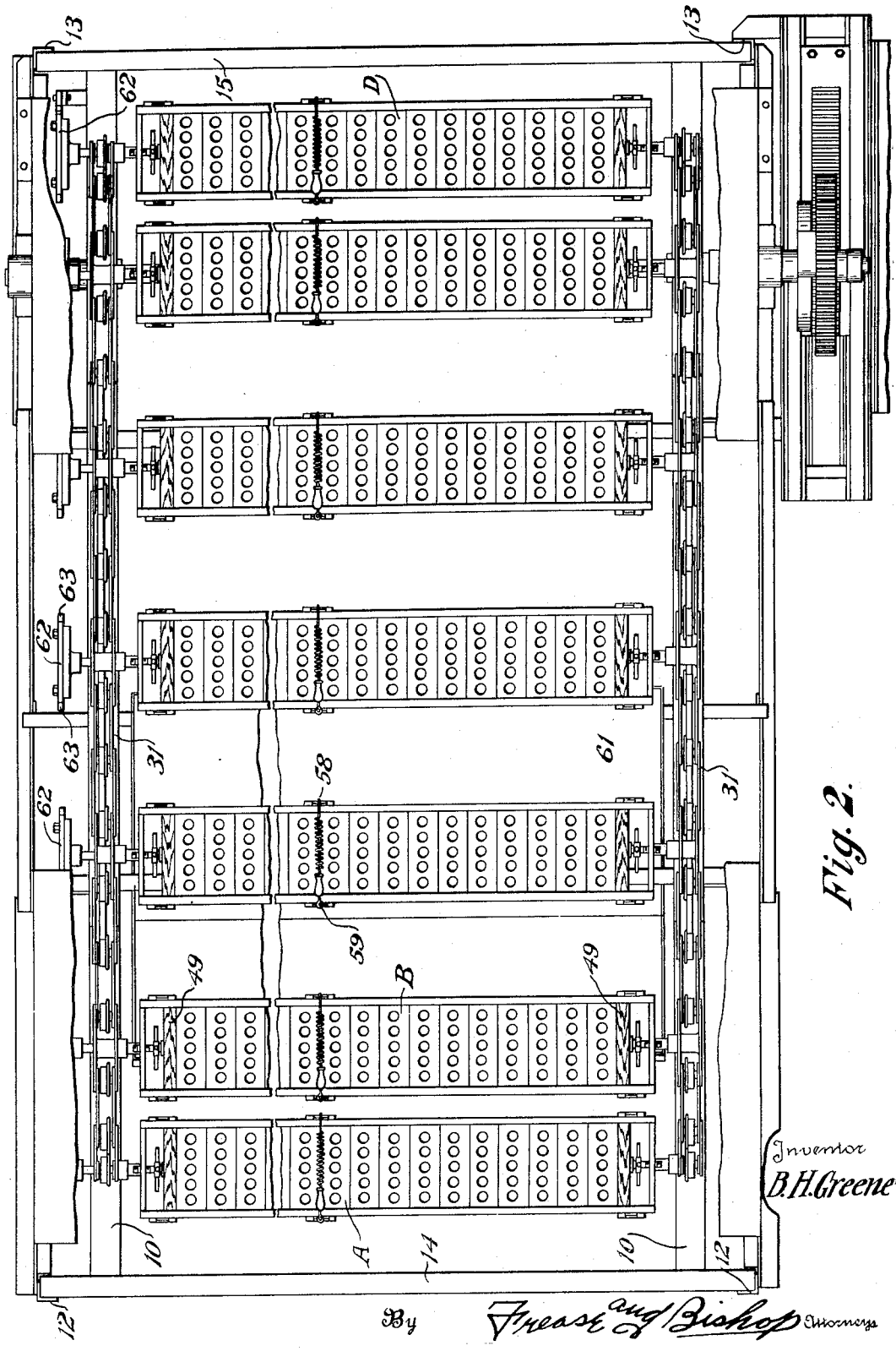

Nov. 14, 1933.                B. H. GREENE                1,935,088
                              MOLDING MACHINE
                         Filed Aug. 15, 1932        3 Sheets-Sheet 1
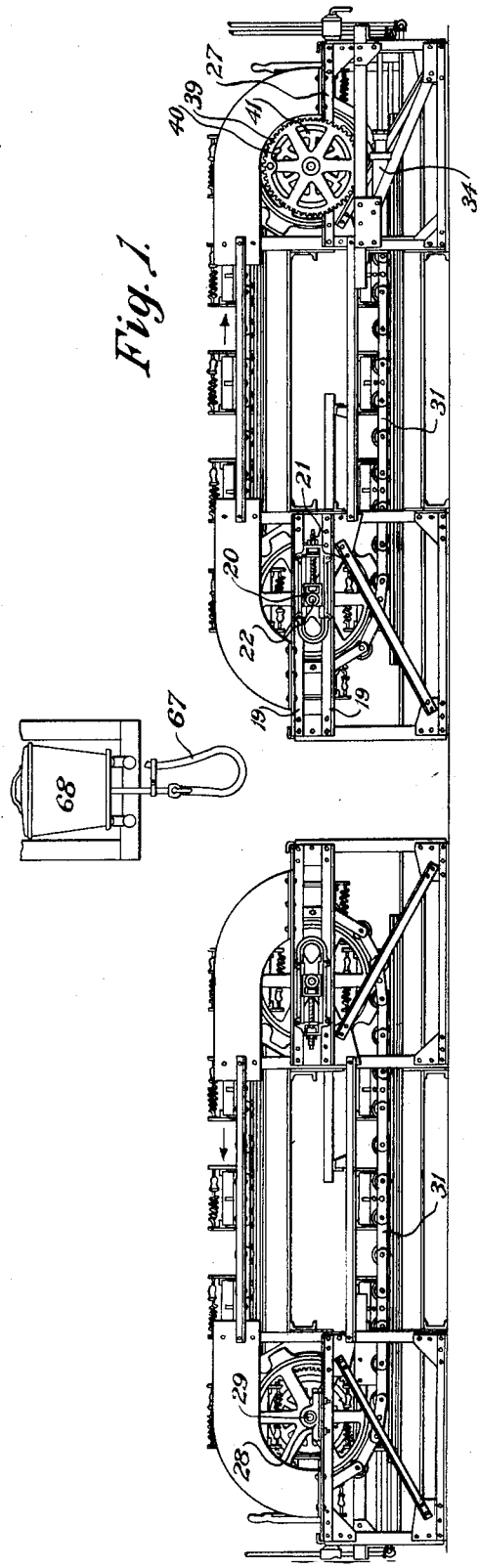
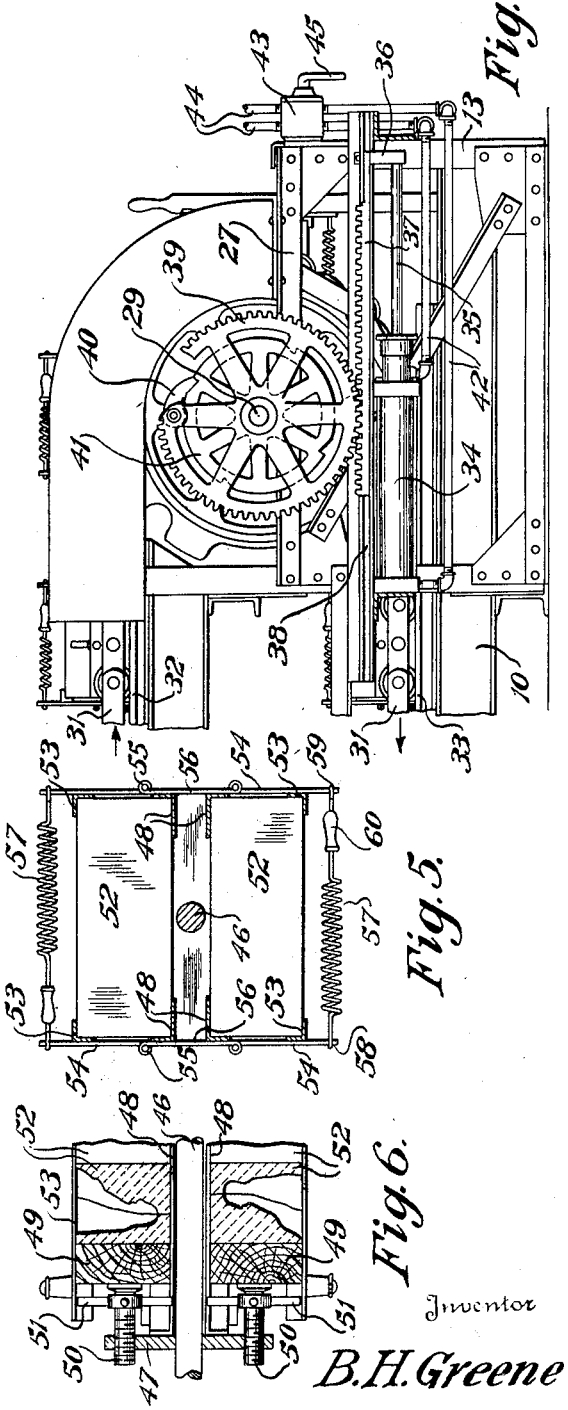
Inventor
B. H. Greene
Frease and Bishop
Attorneys Nov. 14, 1933.  B. H. GREENE  1,935,088
MOLDING MACHINE
Filed Aug. 15, 1932  3 Sheets-Sheet 2

Inventor
B.H.Greene
By Freast and Bishop Attorneys

Patented Nov. 14, 1933

1,935,088

UNITED STATES PATENT OFFICE 1,935,088

MOLDING MACHINE

Bartholomew H. Greene, Sebring, Ohio

Application August 15, 1932. Serial No. 628,786

16 Claims. (Cl. 25—29)

The invention relates to machines for supporting molds such as are used for molding various pottery articles from slip, and more particularly to a continuous machine provided with a plurality of sets of molds whereby the molding of large quantities of articles may be easily and quickly accomplished.

In the manufacture of clay articles from slip, molds having the contour of the article to be formed are filled with the slip, which is a clay solution of about the consistency of milk. The molds to be filled are placed in a row upon a bench and the workman pours the slip from a container into the molds. After standing a sufficient time to permit the slip to form a plastic coating of the desired thickness upon the interior surface of the mold, the surplus slip is poured from the molds and they are placed in inverted position upon the bench, permitting all of the surplus liquid slip to drain therefrom so that the molded articles within the molds will dry sufficiently to permit their removal from the molds. These molds in many cases are large and heavy, being formed of plaster of Paris or other heavy material, and under present practice the molds are manually lifted from the bench and inverted as above described, requiring considerable time and effort on the part of the workman handling the same in first inverting the molds to drain the slip therefrom and then turning the molds back to upright position to remove the molded articles therefrom.

Considerable space in the shop is also taken up by the benches necessary for supporting the molds, as owing to the length of time required for sufficiently drying the molded articles, before they may be removed from the molds, it is customary for the workman to fill a large number of molds at one time and then, invert these molds to permit the slip to drain therefrom, afterwards turning the molds back to the upright position and removing the molded articles therefrom.

The object of the present improvement is to provide a machine adapted to accommodate a plurality of sets of molds and arranged to move each set of molds to a loading station, where the slip is poured into the molds, after which they are moved over a tank or the like and inverted at the proper time to permit the surplus slip to drain therefrom; the molds continuing to move intermittently until the molded articles therein have become sufficiently dry to permit their removal from the molds, at which time they are received at an unloading station where the articles are removed from the molds.

A further object is to provide apparatus of the character referred to in which each unit comprises two complete machines so positioned that one workman can fill the molds of both machines, the molds being moved in opposite directions away from the loading point and a workman being located at the unloading end of each machine.

Figure 3:
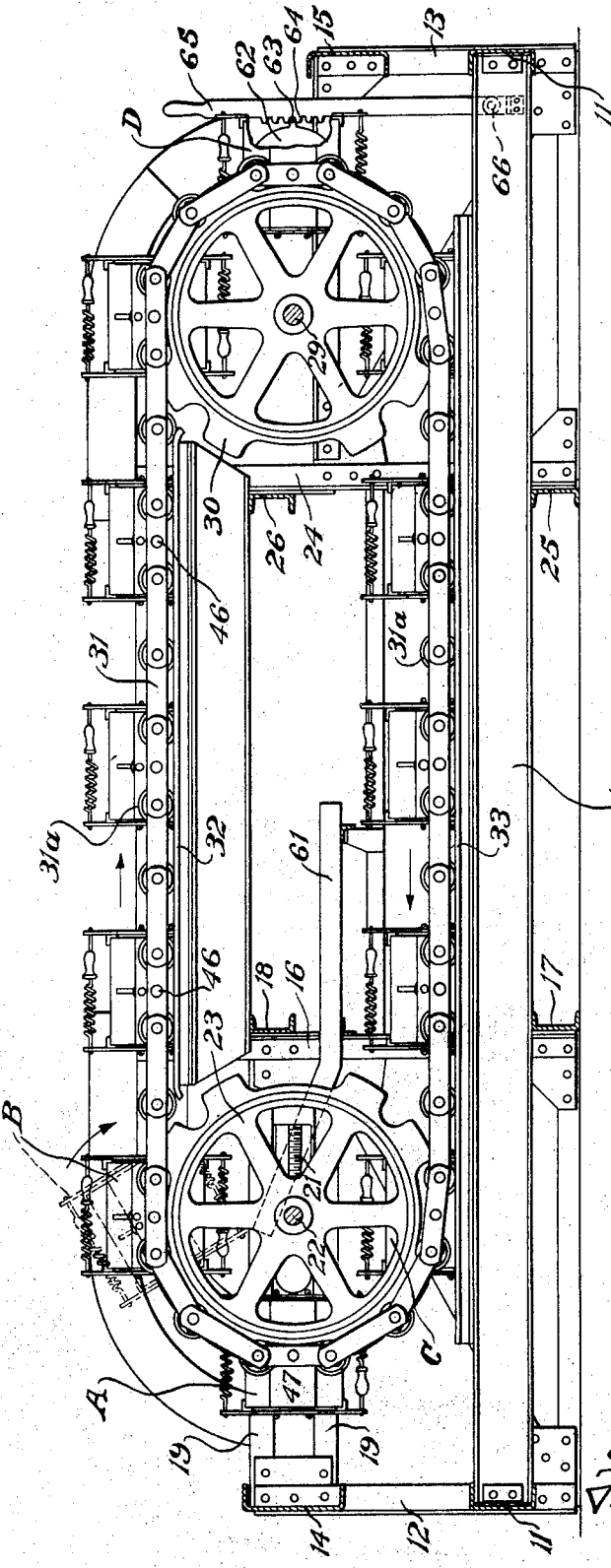

The above, together with other objects which will be apparent from the drawings and the following description, may be attained by constructing the invention in the manner illustrated in the accompanying drawings, in which Figure 1 is a side elevation of one complete unit comprising two similar machines located end to end;

Fig. 2, a top plan view of one of the improved machines;

Fig. 3, a longitudinal sectional elevation of the same;

Fig. 4, a detail elevation of one end portion of the machine showing the means for operating the same;

Fig. 5, a transverse sectional view through one of the sets of molds; and

Fig. 6, a fragmentary longitudinal sectional view of one end portion of one set of molds.

Similar numerals refer to similar parts throughout the drawings.

The improved machine may include a frame comprising the longitudinal structural members 10 joined at their ends by the transverse structural members 11 providing a substantially rectangular horizontal frame, to opposite ends of which may be fixed the uprights 12 and 13. The uprights 12, at the loading end of the machine, may be connected as by the transversely disposed channel iron 14 and the uprights 13 may be similarly connected as by a transversely disposed channel iron 15.

Uprights 16 are connected to the cross member 17 spaced inward from the adjacent end of the frame and fixed to the longitudinal frame members 10. The uprights 16 may be braced as by the transversely disposed channel iron 18 and spaced pairs of guide bars 19 are connected to the transversely disposed channel iron 14 and to the uprights 16 providing guides for the sliding bearings 20 which may be adjusted as by the adjusting screws 21.

The shaft 22 is journaled in the bearings 20 and has fixed thereon a spaced pair of sprockets 23. A pair of uprights 24, similar to the uprights 16, is spaced inward from the other end of the frame and connected to the transverse structural member 25 which is fixed to the side frames 10, the upper portions of the uprights 24 being tied together as by the channel iron 26.

A spaced pair of angle irons or the like, indicated at 27, is supported by the uprights 24 and the channel iron 15 for carrying the bearings 28 in which the shaft 29 is journaled. A spaced pair of sprockets 30, similar to the sprockets 23, is fixed upon the shaft 29.

An endless conveyer chain 31 is located around each of the sprocket wheels 23 and 30, the upper strand of each chain riding upon a rail 32 supported upon the channel irons 18 and 26 and the lower strand thereof riding upon a rail 33 supported upon the adjacent side member 10 of the main frame. Wheels 31a may be provided upon the sprocket chains and arranged to ride upon the rails 32 and 33 in order to reduce the friction in the operation of the conveyer.

For the purpose of driving the endless conveyer chains in the direction of the arrows shown in Figs. 1, 3 and 4, a pneumatic or hydraulic cylinder 34 may be provided. This cylinder may be mounted upon the side of the main frame as shown in Figs. 1 and 4, the plunger 35 thereof being connected at its outer end, as at 36, to a rack bar 37 slidably mounted for longitudinal reciprocation upon a guide track 38 carried by the frame. This rack bar meshes with a gear 39 journaled upon the shaft 29 and provided with a pivoted pawl or detent 40 adapted to engage the ratchet wheel 41 which is fixed upon the shaft 29.

Pipes 42 lead from the controlling valve 43 to opposite ends of the cylinder 34 and supply and outlet pipes 44 are connected to the valve 43 which may be manually operated as by the handle 45 which is located in convenient position for the workman.

The molds are carried in sets located between the conveyer chains 31 and supported thereon as by the spaced transversely disposed shafts 46. A metal plate 47 is fixed upon each end portion of each shaft 46, and duplicate sets of molds are arranged to be supported upon each shaft 46, between the plates 47 thereof, as will be later described.

Angle irons 48 are arranged in spaced pairs and connected to the end plates 47 for the purpose of supporting the molds. Blocks 49 may be slidably mounted upon the angle irons 48, adjacent to the end plates 47, said blocks being preferably of larger dimensions than the end plates and being preferably of a height and width substantially equal to that of the molds to be carried in the structure. These blocks are arranged to be adjusted longitudinally upon the angle irons 48 as by the adjusting screws 50, threaded within the end plates 47 and provided with suitable means such as the hand wheels 51 for manually rotating the screws.

The molds, which are generally indicated by the numeral 52, may be of any usual and well known construction, each mold being separable and formed of plaster of Paris or the like as in ordinary practice. These molds are adapted to be mounted upon the angle irons 48, between the blocks 49, the screws 50 being tightened, forcing the blocks 49 toward each other to tightly clamp the molds between said blocks.

As illustrated, two sets of molds may be accommodated upon each shaft 46, one set being normally located in upright position above the shaft while the other set of molds is located in inverted position beneath the shaft, whereby the upper set of molds is in position to have slip poured therein while the lower set is in position for draining of surplus slip therefrom.

In order to assist in supporting the molds in inverted position, angle irons 53 may be provided for engaging over the outer corners of the molds, each of these angle irons being adapted for clamping engagement with all of the molds of a set.

The angle irons 53 are necessarily removable in order to permit the molds to be removed. For this purpose each angle iron 53 is carried upon links 54 hingedly connected, as at 55, to the brackets 56, which may be fixed to the inner angle irons 48.

For the purpose of normally holding the hinged links 54 in position against the sides of the molds, while permitting the links to be swung outward upon their hinges when it is desired to remove the molds, a spring member 57 may be pivotally connected to the central hinged link 54 at one side of the structure, as indicated at 58 and provided at its other end with an eye or loop 59 adapted to detachably engage the opposite hinged link 54, a handle grip 60 being preferably formed upon said spring member to permit the same to be easily and readily operated.

A drainage trough or tank 61 may be supported upon the frame of the machine, beneath the upper strand of the chain conveyer in order to receive the surplus slip from the molds, as will be later described.

A disk 62 may be fixed upon one end portion of each of the shafts 46 and provided with the diametrically opposite teeth 63 adapted to be engaged by the teeth 64 of the lever 65 fulcrumed as at 66 upon the frame of the machine at the unloading end thereof.

In practice, two of the machines above described are preferably located end to end and oppositely disposed, as shown in Fig. 1, the loading ends of the two machines being spaced apart sufficiently to permit an operator to stand between the same and to fill the molds thereof by means of the hose 67 connected to the container 68, which is suspended overhead, as shown, and contains a supply of slip. A workman is also located at the unloading end of each of the machines, and as the unloading operation requires considerably more time than the loading, three operators may thus operate a unit composed of two machines.

The operation of a single machine will be described as both machines in the unit are operated in the same manner. Each upper set or row of molds, as it reaches the position shown at A in Figs. 2 and 3, adjacent to the loading or filling operator, is filled with slip from the container 68. The unloading operator at the other end of the machine then operates the valve 43 to give a complete return stroke to the plunger 35, first moving the same inward or to the left, as viewed in Fig. 4, which through the rack bar 37, gear 39, pawl 40 and ratchet wheel 41, rotates the conveyer chains a sufficient distance to move the filled set of molds from the position shown at A to that shown at B in Figs. 2 and 3.

On the return stroke of the plunger, the conveyer chains remain in this position while the pawl 40 rides backward over the ratchet wheel 41 until the parts are again brought to the position shown in Fig. 4, in which position they are temporarily stopped. The next set of molds, indicated at C in Fig. 3, has by this operation been moved to the position shown at A and may be filled with slip as above described. The filled set of molds at B is then inverted, as indicated in broken lines in Fig. 3, permitting the surplus slip to drain from the molds.

Sufficient time has already elapsed to permit the formation of a coating of the slip upon the interior of each mold. The filling and draining of each set of molds is thus accomplished step by step, the plunger 35 being intermittently operated after each filling operation.

As the molds are thus intermittently moved forward over the top of the machine, the surplus slip is drained from the lower row of each set of molds into the trough 61 and each set of molds makes a complete orbit of the machine in this position.

It will be seen that as each set of the molds again comes up to the position A, the lower row of the set of molds will contain the formed figures or articles within the molds while the upper row or set of molds will be empty. This upper row of each set will then be filled as it reaches the position shown at A and the molds will again move forward over the top of the machine, having been again inverted when they reached the position B.

It will thus be seen that as each set of molds reaches the unloading position, shown at D, the upper row of the set will contain the formed figures which have dried sufficiently to be removed from the molds while the lower or inverted row of the set contains figures in the process of drying.

The unloading operator will operate the lever 65 to engage the teeth 64 thereon with the tooth 63 of the set of molds positioned at D to hold this set of molds against rotation while the molds in the upper row of the set are opened and the dried figures removed. The molds then return along the lower strand of the chains to the loading position with the inverted lower row of each set of molds containing figures or articles in the course of drying and the upper row of the set being empty, the same being again refilled as it reaches the position A.

I claim:

1. A molding machine including an endless conveyer, spaced sets of molds carried by said conveyer, means for filling the molds with slip, means for independently and selectively inverting each set of molds to drain excess slip therefrom, and means for moving said conveyer.

2. A molding machine including an endless conveyer, spaced sets of molds carried by said conveyer, means for filling the molds with slip, means for independently and selectively inverting each set of molds to drain excess slip therefrom, and means for intermittently moving said conveyer.

3. A molding machine including an endless conveyer, spaced sets of molds carried by said conveyer, means for filling the molds with slip, means for independently and selectively inverting each set of molds to drain excess slip therefrom, a trough in the machine adjacent to the inverted molds to receive the excess slip therefrom, and means for moving said conveyer.

4. A molding machine including an endless conveyer, spaced sets of molds carried by said conveyer, means for filling the molds with slip, means for independently and selectively inverting each set of molds to drain excess slip therefrom, means for moving said conveyer, and means permitting the removal of the molds from the conveyer.

5. A molding machine including an endless conveyer, spaced sets of molds rotatably carried by said conveyer, means for filling the molds with slip, means for inverting each set of molds to drain excess slip therefrom, and means for moving said conveyer.

6. A molding machine including an endless conveyer, spaced sets of molds rotatably carried by said conveyer, means for filling the molds with slip, means for inverting each set of molds to drain excess slip therefrom, means for moving said conveyer, and means for holding each set of molds against movement at one point to permit unloading thereof.

7. A molding machine including an endless conveyer, spaced sets of molds carried by said conveyer, means for filling the molds with slip, means for inverting each set of molds to drain excess slip therefrom, and fluid operated means for moving said conveyer.

8. A molding machine including an endless conveyer, spaced sets of molds carried by said conveyer, means for filling the molds with slip, means for inverting each set of molds to drain excess slip therefrom, and fluid operated means for intermittently moving said conveyer.

9. A molding machine including an endless conveyer, spaced sets of molds rotatably carried by said conveyer, means for filling the molds with slip, means for inverting each set of molds to drain excess slip therefrom, means for moving said conveyer, and a lever for holding each set of molds against movement at one point to permit unloading thereof.

10. A molding machine including an endless conveyer, spaced sets of molds rotatably carried by said conveyer, means for filling the molds with slip, means for inverting each set of molds to drain excess slip therefrom, means for moving said conveyer, a disk associated with each set of molds, and means at one point for engagement with each disk to hold the corresponding set of molds against movement to permit unloading thereof.

11. A molding machine including an endless conveyer, spaced sets of molds rotatably carried by said conveyer, means for filling the molds with slip, means for inverting each set of molds to drain excess slip therefrom, means for moving said conveyer, a disk associated with each set of molds, and a lever at one point for engagement with each disk to hold the corresponding set of molds against movement to permit unloading thereof.

12. A molding machine including an endless conveyer, spaced sets of molds rotatably carried by said conveyer, means for filling the molds with slip, means for inverting each set of molds to drain excess slip therefrom, means for moving said conveyer, a toothed disk associated with each set of molds, and a toothed lever at one point for engagement with each disk to hold the corresponding set of molds against movement to permit unloading thereof.

13. A molding machine including a pair of endless conveyer chains, spaced sets of molds carried by said chains, means for filling the molds with slip, means for independently and selectively inverting each set of molds to drain excess slip therefrom, and means for moving said chains.

14. A molding machine including a pair of endless conveyer chains, spaced sets of molds carried by said chains, means for filling the molds with slip, means for independently and selectively inverting each set of molds to drain excess slip therefrom, and means for intermittently moving said chains.

15. A molding machine including an endless conveyer, spaced sets of molds carried by said conveyer, a drive shaft for the conveyer, a ratchet wheel fixed upon said drive shaft, a gear journaled upon said drive shaft, a pawl upon said gear engaging the ratchet wheel, a rack bar engaging the gear, and means for reciprocating the rack bar.

16. Molding apparatus including two oppositely disposed, similar machines located end to end, each machine including an endless conveyer, spaced sets of molds carried by said conveyer, means for moving said conveyer, a loading station at the adjacent ends of the machines for filling the molds with slip, and unloading stations at the opposite ends of the machines.

BARTHOLOMEW H. GREENE.